United States Patent

Lenetz

[11] Patent Number: 5,379,822
[45] Date of Patent: Jan. 10, 1995

[54] ADJUSTABLE AUTOMOTIVE SIDE WINDOW SHADE

[76] Inventor: Arlene Lenetz, 19852 Highcrest Cir., Santa Ana, Calif. 92705

[21] Appl. No.: 73,569

[22] Filed: Jun. 9, 1993

[51] Int. Cl.⁶ .............................................. B60J 3/00
[52] U.S. Cl. .............................................. 160/370.21
[58] Field of Search ............... 160/370.2 R, 370.2 B, 160/DIG. 2, DIG. 3, 368.1, 354, 327, 328, DIG. 13; 296/97.7, 97.8, 97.9, 138, 141, 145

[56] References Cited

U.S. PATENT DOCUMENTS

| | | | |
|---|---|---|---|
| 3,282,623 | 11/1966 | Paro | 296/97 |
| 4,759,581 | 7/1988 | McNamee | 160/370.2 R X |
| 4,815,784 | 3/1989 | Zheng | 296/97.7 |
| 4,838,600 | 6/1989 | Wischusen | 296/97.8 |
| 4,862,943 | 9/1989 | Shafia | 160/370.2 R |
| 4,944,548 | 7/1990 | Payne et al. | 296/97.8 |
| 4,947,920 | 8/1990 | Moll | 160/84.1 |
| 4,993,471 | 2/1991 | Golden | 160/370.2 |
| 5,024,262 | 6/1991 | Huang | 160/370.2 |
| 5,031,684 | 7/1991 | Soon et al. | 160/370.2 |
| 5,035,460 | 7/1991 | Huang | 296/95.1 |
| 5,064,239 | 11/1991 | Folcik | 296/97.7 |
| 5,165,748 | 11/1992 | O'Conner | 296/97.6 |
| 5,213,147 | 5/1993 | Zheng | 160/370.2 R |
| 5,253,695 | 10/1993 | Nenstiel | 160/370.2 R |

Primary Examiner—David M. Purol
Attorney, Agent, or Firm—Leslie Badin, Jr.

[57] ABSTRACT

An automotive side window shade for mounting on the side window to block the sun and heat from entering the automobile through the side window. It has a tapered end to approximate the side vent area of the window and has a length adjustment feature for adaptation to variations in automobile side window sizes. The tapered end also contains additional shade material which can be used on automobiles with larger side vent areas. By use of various holding devices attached to both sides of the shade makes it reversible so that it is mountable on any of the side windows. The shade is made from flexible material so that it can be folded into a compact size for storage.

7 Claims, 1 Drawing Sheet

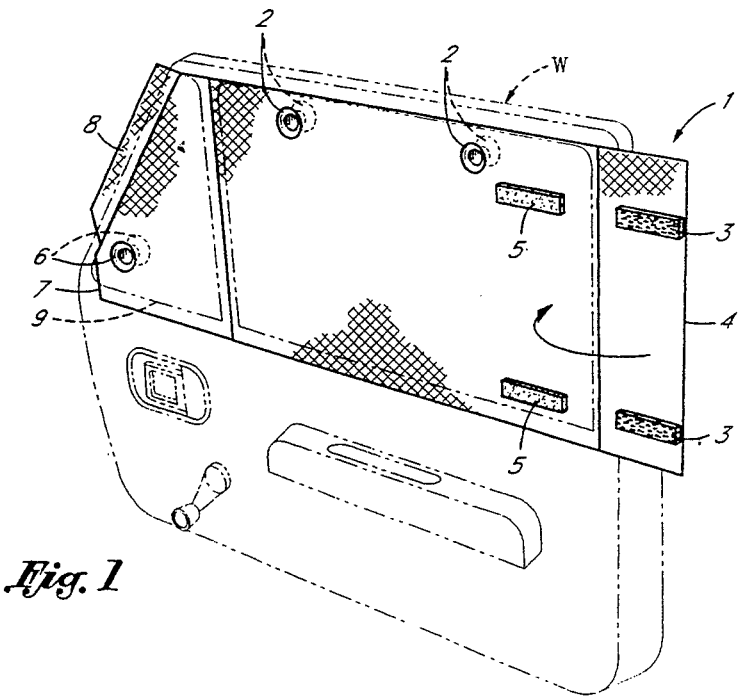
*Fig. 1*
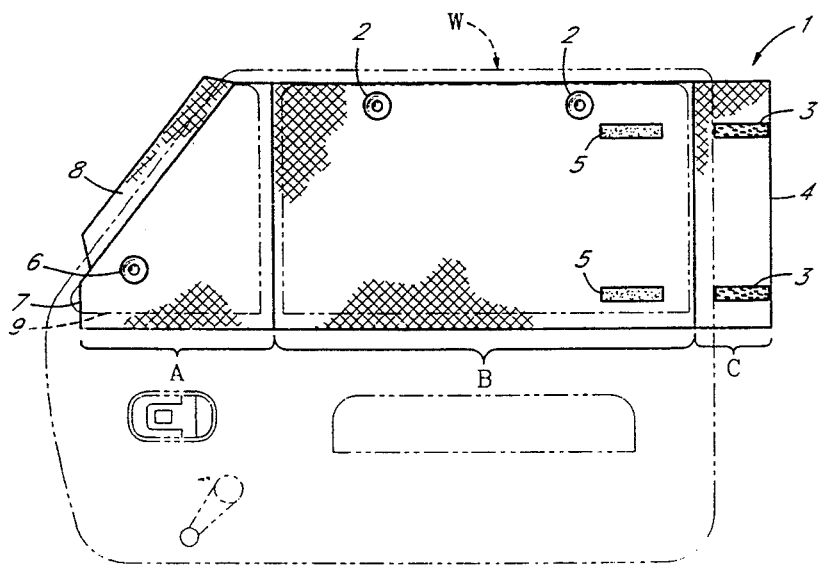

ADJUSTABLE AUTOMOTIVE SIDE WINDOW SHADE

BACKGROUND OF THE INVENTION

1. Field of the Invention

This invention relates to an improved adjustable side window shade for automobiles for preventing sunlight from entering the interior of the automobile.

2. Description of Related Art

There are varieties of types of blinds and shades for motor vehicles known in the art for quite some time. An example of a partial sun shade which is mounted on the window of an automobile by means of a suction cup and is adjustable in length is disclosed in Paro U.S. Pat. No. 3,282,623 which utilizes two rectangular pieces which can slide with respect to each other to adjust the overall shade length. Further adjustment of the sun shade with respect to the plane of the window is provided by manual manipulation of the attaching pivoting arm. A shade to cover the side windows is disclosed in Zheng U.S. Pat. No. 4,815,784 which utilized two adjacent flexible loops covered by sheet fabric material. A similar shade utilizing only a single flexible elongated loop is disclosed in Huang U.S. Pat. No. 5,024,262. Another side window shade for automobiles is disclosed in Payne et al U.S. Pat. No. 4,944,548 which utilizes fixed length horizontally sectioned panels and is attached to the window by means of suction cups. Still another sunscreen is disclosed in FOLCIK U.S. Pat. No. 5,064,239 which uses a stretchable fabric that is attached to hook and loop fasteners placed on the four corners of the window. For a door window, the Folcik patent shows a rectangular piece of material attached by two hook and loop fasteners placed along the top edge of the window.

A drawback to the window shade devices known in the art is that they do not cover most of the side window area, are not easily adjustable to fit different models of automobiles, and do not have provisions for covering the side window vent area.

Thus, there is a need in the art for providing a side window shade to cover a major portion of the side window including the side vent area on a variety of different size and design of automobile side windows which are not necessarily rectangular, is easy to adjust, is easy to mount, is easy to remove, and is easy to fold and store when not in use.

SHORT STATEMENT OF THE INVENTION

It is therefore an object of this invention to provide an improved automotive side window shade that will approximate the entire surface area of the side window. In this invention, a shade is used to block the heat and sun from entering through the side window. It can be folded to a very compact size for storage. It's horizontal length is independently adjustable for the top and bottom lengths for a particular side window configuration by folding back and securing any additional shade material. One end of the shade is tapered to approximate the side vent area of the window. In order to accommodate variations in window side vent designs, a flap of shade material is provided along the tapered edge to provide additional shading coverage.

It is further the object of this invention that the shade be reversible and thus be mountable on either side of the automobile as well as on the front or rear side windows. Accordingly, the adjustable automotive side window shade of the present invention to block the heat and sun from entering an automobile's side window includes window mounting attachment means on both sides of the shade.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a perspective view of a preferred embodiment of the adjustable automobile side window shade of the present invention shown completely extended and mounted on the inside of the front passenger door window.

FIG. 2 is a plan view illustrating the coverage afforded by the present invention shown completely extended and mounted on the inside of the front passenger door window and showing the three distinct sections of the invention.

DETAILED DESCRIPTION OF THE PREFERRED EMBODIMENT

The preferred embodiment of the present invention is illustrated by way of example in FIGS. 1 and 2. FIG. 1 shows a shade 1 in a form to essentially cover most of the surface window area of an automobile side window, W, with additional shading capacity for larger side windows. FIG. 2 shows that the shade 1 is defined by three distinct sections, section A which is tapered to cover the side vent area 9 of the automobile side window W; section B is generally trapezoidal to cover the remaining portion of the side window W area; and section C which is a contiguous portion of section B that is additional shade 1 material for the illustrated side window W that will be folded back onto section B and held in the folded position by at least one set of upper securing means 3 and 5 attached to the same side of the shade 1. Sections B and C, therefore adjust cooperatively to conform to the general shape of the remaining side window area. A pair of upper and lower securing means 3 are placed along the vertical edge 4 of shade 1. The edge 4 can be grasped and folded over section B so that at least a portion of the upper and lower securing means 3 overlap and attach to their respective upper and lower securing means 5, thus any additional horizontal shade material is stored folded over section B. Preferred securing means 3 and 5 are touch fastener material such as that sold under the tradename VELCRO. Other securing means of keeping the additional horizontal shade material of section C folded may be accomplished by the use of other conventional fasteners like for example snaps in place of VELCRO.

One advantage of the invention which is inherent in the foregoing structure is that the top and bottom lengths of section B are adjustable by securing means 3 and 5 so that they may be of different lengths. Therefore the vertical side of section B farthest from section A can vary to form an obtuse as well as to an acute angle with respect to the bottom edge of section B to match variations in side window W edge that is other than straight up and down.

The shade 1 is affixed to the side window W by conventional attachment means. One example of conventional attachment means is by use of electrostatic means. Another example of conventional attachment means is illustrated in FIGS. 1 and 2, wherein the means are by at least two holding devices 2 along the top edge of section B and by at least one holding device 6 near the tapered end 7 located on the bottom corner in the side vent section A. The holding devices 2 and 6 may be conventional hooks, suction cups, or tabs attached on the window facing side of the shade 1. The preferred holding devices 2 and 6 are placed on both sides of the shade 1 and are suction cups. The suction cups permit ease of attachment of the shade 1 as well as ease of removal and storage. By having holding device 2 and 6 on both sides of the shade 1 as attachment means, the shade 1 is reversible and is mountable on any side window of the automobile, i.e. driver's front side window, driver's rear side window, passenger's front side window, and passenger's rear side window.

A flap of material 8 attached along the top tapered edge of section A is shown extended to provide additional shading coverage and to accommodate variations in the general physical shape of the side vent area 9 of the side window W.

The shade 1 is constructed of any material suitable for reflecting light and heat radiation from the sun. The material's reflecting properties may vary from completely opaque to a sheer material that will permit some of the sunlight to enter the automobile. The preferred material is flexible and thus may be folded easily for storage.

The dimensions of sections A, B, and C are varied to accommodate various size automobile side windows W. Thus the shade 1 is suited for two-door and four-door automobiles. It is to be appreciated that once the shade 1 is adjusted to a particular size side window, the additional material may be cut off, ending with a customized shade for that particular design of window. It is to be further appreciated that such a customized shade may still be reversibly used and mounted on the other corresponding side window of the automobile.

It is to be understood that the vertical lines located between sections A and B and between sections B and C in FIGS. 1 and 2 are for illustrative purposes for discussion and for clarification of the various sections of the shade 1. Shade 1 may be constructed of a single sheet of material and thus would not necessarily have a line or a seam at these locations.

Another embodiment of the side window shade 1 shown in FIGS. 1 and 2 without defeating the main objects of the invention is by providing rigidity means (not shown) to shade 1 or independently rigidity means (not shown) to the various sections A, B, or C. By way of an example, the perimeter of section B may be rigidized by use of a conventional imbedded collapsible flexible coil means (not shown) to hold the shade material in an open position. Thus section C may then be used to adjust the shade coverage. Such rigidized section B reduces the number of attaching means 2 required.

While the side window shade of the present invention has been disclosed in connection with an automobile, it should be appreciated that the side window shade can be used in other vehicles and in other applications. The present invention provides an improved window shade to approximate the entire surface area to be covered. The window shade has simple adjustable means and simple attachment means. Thus, the window shade of the present invention has the important advantage of providing a versatile shade means.

While the present invention has been disclosed in connection with the preferred embodiment thereof, it should be understood that there may be other embodiments which fall within the spirit and scope of the invention as defined by the following claims.

What is claimed is:

1. An adjustable automotive side window shade comprising:
    a first section of shade material having a tapered edge on one side to approximate the side window having a tapered vent area;
    a second section of shade material attached to the first section, wherein the second section is shaped to approximate the side window having a trapezoidal area;
    a third section of shade material which is a contiguous portion of the second section, wherein the third section extends beyond the side window and constitutes excess shade material for the side window;
    securing means for affixing the third section to the second section of the shade; and
    attachment means affixed to the first and to the second section for securing the shade to the side window.

2. The shade as in claim 1, wherein the attachment means are mounted on both sides of the shade.

3. The shade as in claim 1, wherein the attachment means are suction cups.

4. The shade as in claim 2, wherein the attachment means are suction cups.

5. The shade as in claims 1, 2, 3, or 4 further comprising a flap of additional material affixed along the tapered edge of the first section in order to accommodate variations in the side window tapered vent area.

6. The shade as in claim 5, wherein the securing means for the third section is at least one set of touch fastener material.

7. The shade as in claim 5, wherein the securing means for the third section is at least one set of snaps.

* * * * *